(12) United States Patent
Matsushita

(10) Patent No.: US 8,414,998 B2
(45) Date of Patent: *Apr. 9, 2013

(54) HEAT INSULATOR

(75) Inventor: Takamichi Matsushita, Tokyo (JP)

(73) Assignee: Kankyokeieisogokenkyusho Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,742

(22) Filed: Apr. 4, 2011

(65) Prior Publication Data

US 2011/0244180 A1 Oct. 6, 2011

(30) Foreign Application Priority Data

Apr. 2, 2010 (JP) ................................. 2010-085980

(51) Int. Cl.
*B32B 3/24* (2006.01)
*B32B 5/18* (2006.01)
(52) U.S. Cl. ........ 428/136; 428/158; 428/159; 428/107; 428/903.3; 428/304.4
(58) Field of Classification Search .................. 428/136, 428/158, 159, 107, 903.3, 304.4
See application file for complete search history.

(56) References Cited

U.S. PATENT DOCUMENTS

| | | | |
|---|---|---|---|
| 3,987,134 A * | 10/1976 | Shiina et al. ................. | 264/45.4 |
| 4,333,978 A * | 6/1982 | Kocher ......................... | 428/158 |
| 4,346,133 A * | 8/1982 | Hipchen et al. ............... | 428/109 |
| 4,952,450 A | 8/1990 | Noel | |
| 6,413,613 B1 * | 7/2002 | Byma ............................ | 428/116 |
| 2004/0171707 A1* | 9/2004 | Martel et al. ..................... | 521/54 |
| 2006/0073294 A1* | 4/2006 | Hutchinson et al. ......... | 428/35.7 |
| 2009/0127731 A1 | 5/2009 | Kitamura | |
| 2010/0227149 A1* | 9/2010 | Koo et al. .................. | 428/304.4 |
| 2011/0105667 A1* | 5/2011 | Brenner et al. ............... | 524/423 |

FOREIGN PATENT DOCUMENTS

| | | |
|---|---|---|
| JP | 08-074345 | 3/1996 |
| JP | 2003-041041 | 2/2003 |
| JP | 2003-301061 | 10/2003 |

* cited by examiner

*Primary Examiner* — William P Watkins, III
(74) *Attorney, Agent, or Firm* — Paul A. Guss

(57) ABSTRACT

A heat insulator that generates no smoke when incinerated, has a low calorific value, and achieves a desired dimension and heat insulation performance is provided. A heat insulator 1 is formed by heat-mixing, in an extruder 11, a paper pellet 7 that is a mixture of a fine paper powder having a particle diameter of 30 to 200 μm and starch, a container recycle pellet 8 that is a mixture of polypropylene, polyethylene, and polystyrene, foamable polypropylene 9, and water 10 to obtain a plate-like foamed product 2, and orthogonally overlaying a plurality of plate-like foamed products 2. A weight distribution is set so that the paper pellet 7 is 50 to 65% by weight, the container recycle pellet 8 is 13 to 25% by weight, the foamable polypropylene 9 is 10 to 30% by weight, and the water 10 is 10 to 20% by weight to these resins and other materials.

4 Claims, 5 Drawing Sheets

HEAT INSULATOR

BACKGROUND OF THE INVENTION

1. Field of the Invention

The present invention relates to a heat insulator used for a residential floor and the like.

2. Description of the Related Art

Heat insulators made of various types of materials are used today. For example, as a heat insulator for residential heat insulation, a mineral-based heat insulator such as glass wool or rock wool, a plastic-based heat insulator such as rigid urethane foam or extruded polystyrene foam, or a heat insulator using a natural ingredient such as cellulose fibers or carbonized foam cork is put to use.

Patent Document 1 listed below discloses, as a residential heat insulator, a plate-like heat insulator that is fit between support members such as floor joists, pillars, and ceiling joists and composed of a foamed styrene resin molding or a rigid polyurethane foam.

[Patent Document 1] Japanese Patent Application Laid-Open No. H08-74345
[Patent Document 2] Japanese Patent Application Laid-Open No. 2003-41041

SUMMARY OF THE INVENTION

The heat insulator disclosed in above-mentioned Patent Document 1 is a plastic-based heat insulator, which has a significant environmental burden upon manufacture or disposal. For instance, a foamed styrene resin molding has a large carbon number due to its molecular structure. Accordingly, remaining carbon that cannot react with oxygen burns incompletely and becomes soot, causing generation of smoke during incineration. Besides, foamed polystyrene is about 9000 to 10000 cal/g in calorific value, that is, has a high calorific value per unit weight.

Moreover, these heat insulators are made fire-retardant by mixing a fire-retardant material into raw materials, which causes emission of toxic gas when burned. This raises a possibility of damage by toxic gas in the case of fire. Furthermore, since these heat insulators are high in calorific value, there is a possibility that an incinerator is damaged upon disposal.

On the other hand, in Patent Document 2, the present inventors provide a foam member that generates no smoke when incinerated and has a low calorific value, and a manufacturing method of the foam member. If such a foam member can be employed as a residential heat insulator, a heat insulator without a significant environmental burden upon manufacture or disposal can be obtained.

In view of this, the present inventors attempted to mold a heat insulator by extruding the foam member disclosed in Patent Document 2 by an extruder having a width dimension for a residential heat insulator. In detail, polypropylene, a fine paper powder of 30 to 100 µm in average particle diameter, and starch of 5 to 150 µm in average particle diameter were supplied to the extruder and mixed together under heat, and further water was mixed into the high-temperature molten mixture to manufacture the heat insulator. A weight ratio of polypropylene, the fine paper powder, and starch is such that polypropylene is 25% by weight, the fine paper powder is 55% by weight, and starch is 25% by weight. A weight ratio of water to the molten mixture is 25% by weight.

However, molding the foam member disclosed in Patent Document 2 by the extruder resulted in a failure to attain a desired width dimension. As a result of investigating the cause of the failure, the present inventors found the cause to be an insufficient foam volume as a foamed product.

The present inventors then used foamable polypropylene suitable for a foamed product, as polypropylene which is a resin raw material of a foamed product. As a result, a sufficient foam volume was attained, enabling a heat insulator of a desired dimension to be obtained. However, the obtained foamed product lacked sufficient heat insulation performance, and was unable to be used as a residential heat insulator.

The present invention has an object of providing a heat insulator that generates no smoke when incinerated, has a low calorific value, and achieves a desired dimension and heat insulation performance.

As a result of further conducting intense study, the present inventors found that desired foaming and heat insulation performance can be achieved by mixing, at a predetermined ratio, a recycled resin which is a mixture of a polyethylene resin, a polypropylene resin, and a polystyrene resin, into foamable polypropylene which is a resin raw material of a foamed product.

A heat insulator according to the present invention is a heat insulator including a plate-like foamed product, the plate-like foamed product being made from a plurality of rod-like elements while tightly connecting the surfaces of adjacent rod-like elements to each other, so that voids that extend in a longer direction of the rod-like elements are formed between the rod-like elements; the heat insulator being formed by bonding a plurality of plate-like foamed products together so that the longer directions of the rod-like elements forming the plate-like foamed products are mutually orthogonal; the plurality of rod-like elements being made from a heated and foamed mixture of 50 to 65% by weight a paper pellet, 13 to 25% by weight a recycled resin, and 10 to 30% by weight a foamable polypropylene resin, the total sum thereof being 100% by weight; the paper pellet being a mixture of 35 to 50% by weight a fine paper powder having a particle diameter of 30 to 200 µm and 50 to 65% by weight a hydrophilic macromolecule, the total sum thereof being 100% by weight; and the recycled resin being a mixture of 55 to 65% by weight a recycled polypropylene resin, 30 to 40% by weight a recycled polyethylene resin, and 1 to 5% by weight a recycled polystyrene resin, the total sum thereof being 100% by weight. In the present specification, the term "the total sum thereof is 100% by weight" allows inclusion of minute unavoidable impurities, in addition to the listed materials.

With the above-mentioned range of weight distribution of each raw material, the heat insulator according to the present invention can achieve a desired dimension and heat insulation performance as a residential heat insulator. Moreover, the heat insulator can be manufactured using, as the recycled resin, a container recycle pellet (hereafter abbreviated as "container re-pellet").

Moreover, by bonding the plurality of plate-like foamed products together so that their extrusion directions from the die are mutually orthogonal, higher mechanical strength can be achieved. Hence, deflection can be suppressed when installing the heat insulator under floor or the like.

The container re-pellet is a pellet formed in order to reuse food containers or daily commodity containers (e.g., shampoo containers, detergent containers, and so on) after cleaning and the like, and inevitably includes polypropylene, polyethylene, and polystyrene. Polypropylene and polyethylene are both a polyolefin-based resin, which is considered to emit no toxic gas when burned. Hence, polypropylene and polyethylene are extensively used for food containers and daily commodity containers. However, despite an effort to mix the two resins, they do not mix with each other, so that the mixture cannot be molded.

Therefore, though the container re-pellet that inevitably includes the two resins is produced in large quantity due to increased recycling activities in recent years, demand for the container re-pellet is low because it cannot be used as a raw material in ordinary plastic molding factories. Besides, various additives are added to each resin according to container applications. This being so, when the container re-pellet is used as a molding raw material, a molded object will end up being unstable in quality. For these reasons, the container re-pellet has not been used as a molding raw material.

The heat insulator according to the present invention uses such a container re-pellet as a raw material, where polypropylene and polyethylene are uniformly mixed, with there being no unevenness in quality. Moreover, though desired performance as a heat insulator cannot be attained when simply using foamable polypropylene as a raw material, the use of the container re-pellet enables a foamed product of high heat insulation performance to be obtained.

Thus, the heat insulator according to the present invention includes, as a raw material, at least 50% by weight the paper pellet having a low calorific value, and so is low in calorific value. In addition, the present inventors conducted a burning test on the heat insulator according to the present invention, and found no toxic smoke. Moreover, the heat insulator according to the present invention can achieve a desired dimension and heat insulation performance. Furthermore, since the container re-pellet which has conventionally been low in demand can be used as a raw material, container recycling can be promoted.

Preferably, in the heat insulator according to the present invention, the rod-like elements are formed by heat mixing and foaming the paper pellet, the recycled resin, the foamable polypropylene resin and water, the water being in a range of 10 to 20% by weight to the paper pellet, the recycled resin, and the foamable polypropylene resin.

More preferably, in the heat insulator according to the present invention, an uppermost plate-like foamed product of the plate-like foamed products is wider than a lower plate-like foamed product of the plate-like foamed products, and has, in a thickness direction, slits that are orthogonal to the longer direction of the rod-like elements near front and back ends of the the longer direction of the rod-like elements.

The plate-like foamed product is the connected body of the rod-like elements. Accordingly, even when a compressive force is applied to the plate-like foamed product from the extrusion direction, the force acts upon in a longitudinal direction of each rod-like element, resulting in a small compression amount of the plate-like foamed product. On the other hand, when a force of compressing the plate-like foamed product is applied from a direction orthogonal to the extrusion direction, voids between the rod-like elements are easily compressed, resulting in a large compression amount of the plate-like foamed product.

In the case where the heat insulator formed by overlaying such plate-like foamed products with the uppermost plate-like foamed products being wider than the lower plate-like foamed product is installed in an installation position, a compressive force tends to be applied to the uppermost plate-like foamed product. Since the plate-like foamed product is easily compressed by a compressive force applied from a direction orthogonal to the extrusion direction of the plate-like foamed product, the heat insulator can be easily installed in the installation position.

On the other hand, the plate-like foamed product is less prone to be compressed by a compressive force applied from the extrusion direction of the plate-like foamed product. However, the provision of the slits allows the uppermost plate-like foamed product to be easily deformed, so that the heat insulator can be easily installed in the installation position.

Preferably, in the heat insulator according to the present invention, a sheet member covers a bottom surface and at least one pair of side surfaces of an assembly of the plate-like foamed products, and has protrusions that protrude outward from upper edges of the pair of side surfaces.

Since the sheet member has the protrusions that protrude outward from the upper edges of the pair of side surfaces of the heat insulator, the heat insulator can be installed in the installation position using the protrusions. According to this structure, a heat insulator easily installable in an installation position can be provided.

DESCRIPTION OF THE PREFERRED EMBODIMENTS

The following describes a heat insulator according to the present invention, with reference to FIGS. 1 to 6.

Figure 1:
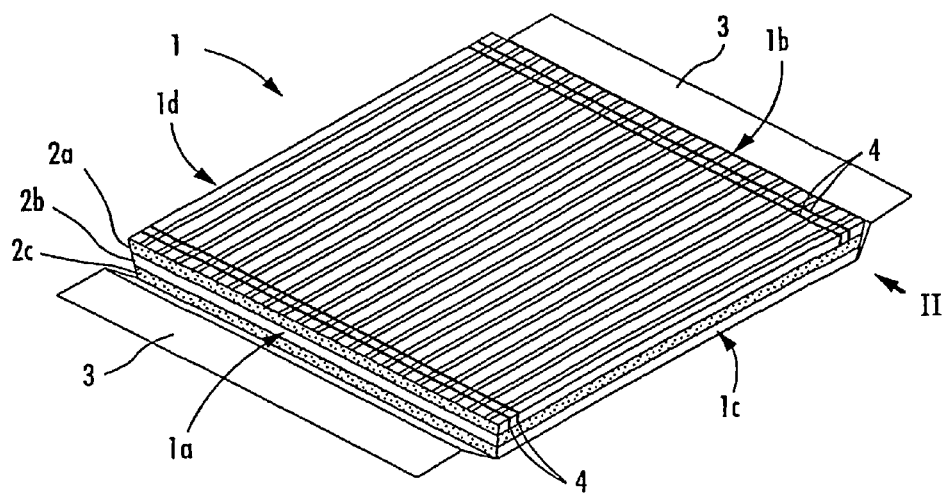
FIG. 1 is an explanatory view showing a heat insulator according to the present invention.
Figure 2:
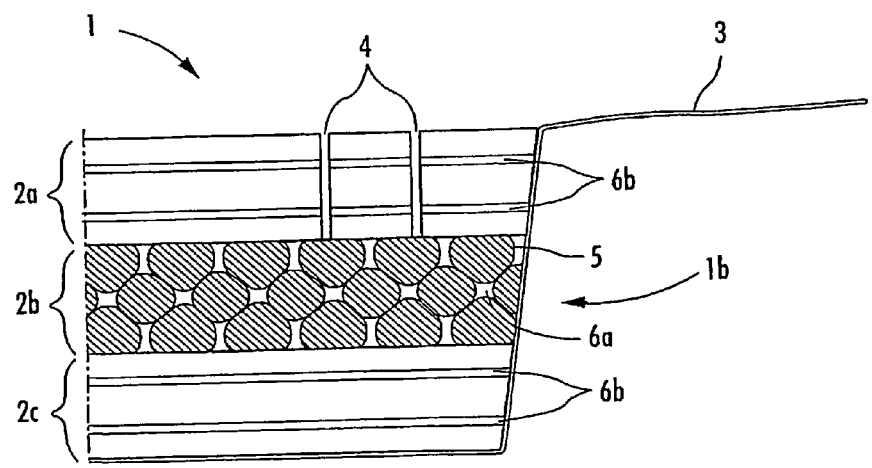
FIG. 2 is an enlarged view showing the heat insulator as seen from arrow II in FIG. 1.

A heat insulator 1 in an embodiment of the present invention is a heat insulator for residential underfloor heat insulation. As shown in FIGS. 1 and 2, the heat insulator 1 is formed by overlaying three plate-like foamed products 2 that are extrusion-molded. A bottom surface and a pair of side surfaces of the heat insulator 1 are covered with a sheet member 3. Note that FIG. 1 shows a state where the sheet member 3 is separated from a side surface 1*a* in the front, to reveal the structure of the heat insulator 1.

In the heat insulator 1 in this embodiment, the three plate-like foamed products 2 (2*a* to 2*c*) are overlaid so that their extrusion directions are mutually orthogonal, as shown in FIGS. 1 and 2. A vinyl chloride adhesive is applied to an entire contact surface of each of the plate-like foamed products 2*a*, 2*b*, and 2*c* to bond the plate-like foamed products 2*a*, 2*b*, and 2*c* together.

Moreover, two pairs of slits 4 orthogonal to the extrusion direction (a longitudinal direction of rod-like elements 5) are formed in the plate-like foamed product 2 situated at the upper surface of the heat insulator 1, respectively near the side surfaces 1*a* and 1*b*. As shown in FIGS. 1 and 2, these slits 4 are formed only in the uppermost plate-like foamed product 2*a*, and are not formed in the middle and lower plate-like foamed products 2*b* and 2*c*. In this embodiment, the slits 4 have a width of about 3 mm.

Furthermore, the heat insulator 1 has a trapezoidal shape with a shorter base in a lateral view so that the upper plate-like foamed product 2 gradually increases in dimension as compared with the lower plate-like foamed product 2, as shown in FIG. 2. In detail, the lower plate-like foamed product 2 has a length of 802 mm at its bottom, and the upper plate-like foamed product 2 has a length of about 808 mm at its top. These dimensions are appropriately changed according to a site where the heat insulator 1 is used.

In this embodiment, a nonwoven fabric of about 0.7 mm in thickness is used as the sheet member 3. The sheet member 3 is bonded to the bottom surface of the heat insulator 1 at a plurality of points, but is not bonded to the side surfaces 1a and 1b. These bonded portions can be peeled away at a construction site and the like, according to need. The sheet member 3 does not cover side surfaces 1c and 1d of the heat insulator 1.

Figure 3:
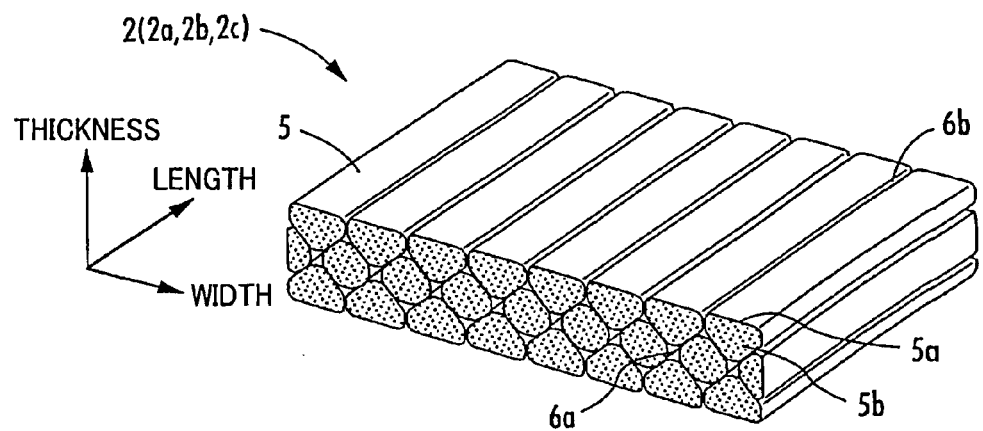
FIG. 3 is an explanatory view showing a plate-like foamed product that constitutes the heat insulator.
Figure 4:
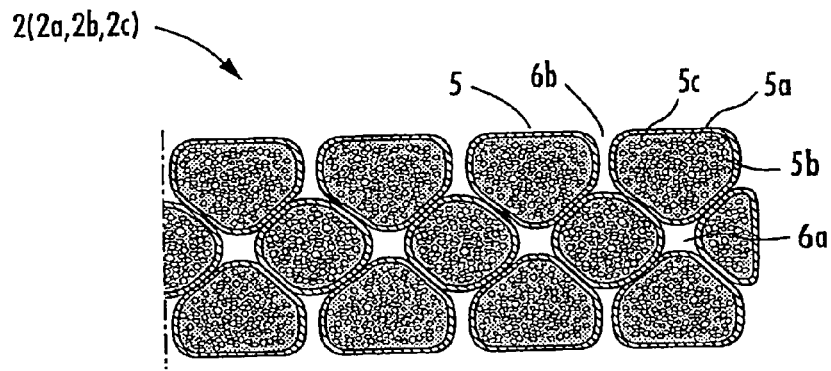
FIG. 4 is an enlarged view showing a cross section of the plate-like foamed product.

The following describes the plate-like foamed product 2 that constitutes the heat insulator 1 in this embodiment, with reference to FIGS. 3 and 4. Main raw materials of the plate-like foamed product 2 are a paper pellet 7, a recycled resin pellet 8, and a foamable resin pellet 9, with water 10 being used for foaming (see FIG. 5).

As shown in FIG. 3, the plate-like foamed product 2 is a plate-like foamed product formed by connecting a plurality of rod-like elements 5 extending in an axial direction. Each rod-like element 5 has a two-layer structure of a skin layer 5a and a foam layer 5b, as shown in FIG. 4. A large number of bubbles 5c exist in the foam layer 5b. The rod-like elements 5 are in a state where skin layers 5a on their surfaces are tightly connected to each other. Moreover, there are voids 6a between the rod-like elements 5, forming grooves 6b on the surface of the plate-like foamed product 2, as shown in FIG. 4.

The paper pellet 7 is manufactured by mixing 35 to 50% by weight a fine paper powder obtained by grinding used paper into a fine powder, and 50 to 65% by weight starch which is a hydrophilic macromolecule, a total sum thereof being 100% by weight. However, minute unavoidable impurities are also included therein When doing so, additives such as an antioxidant and a fungicide are added according to purposes and applications. For example, as the used paper, roll paper which has become industrial waste is coarsely grinded to about 2 mm square, and then finely grinded to 30 to 200 μm in particle diameter using a solid roller mill not shown. As the starch, typically used industrial starch is employed.

The recycled resin pellet 8 is a container re-pellet obtained by recycling containers made of synthetic resin. Though the recycled resin pellet 8 slightly differs in component ratio depending on the recycled container type, in this embodiment the recycled resin pellet 8 is a mixture of 55 to 65% by weight polypropylene, 30 to 40% by weight polyethylene, and 1 to 5% by weight polystyrene, a total sum thereof being 100% by weight, and is molded in pellet form. However, minute unavoidable impurities are also included therein The foamable resin pellet 9 is an HMS-PP type foamable polypropylene in this embodiment. Conventional polypropylene typically has poor tensile strength in a molten state and so has low foamability. Accordingly conventional polypropylene is not suitable for use in a foamed product. In recent years, however, foamable polypropylene with strengthened melt tension (also referred to in the art as high melt strength polypropylene or HMS-PP) has been developed. In this embodiment, "NEWFOAMER" made by Japan Polypropylene Corporation is used as one such HMS-PP foamable polypropylene.

In this embodiment, a ratio of these main raw materials is set in a range where the paper pellet 7 is 50 to 65% by weight, the recycled resin pellet 8 is 13 to 25% by weight, and the foamable resin pellet 9 is 10 to 30% by weight (the total sum thereof is 100% by weight). Then 10 to 20% by weight of the water is added to these main raw materials. A foamed product having a foam expansion ratio of 30 to 50 times is obtained by setting the ratio of the main raw materials in the above-mentioned range in this embodiment. Since the plate-like foamed product 2 has such a foam expansion ratio, various plate-like foamed products with a width of 0.9 m to 1.0 m or more required as a residential heat insulator can be molded.

Figure 5:
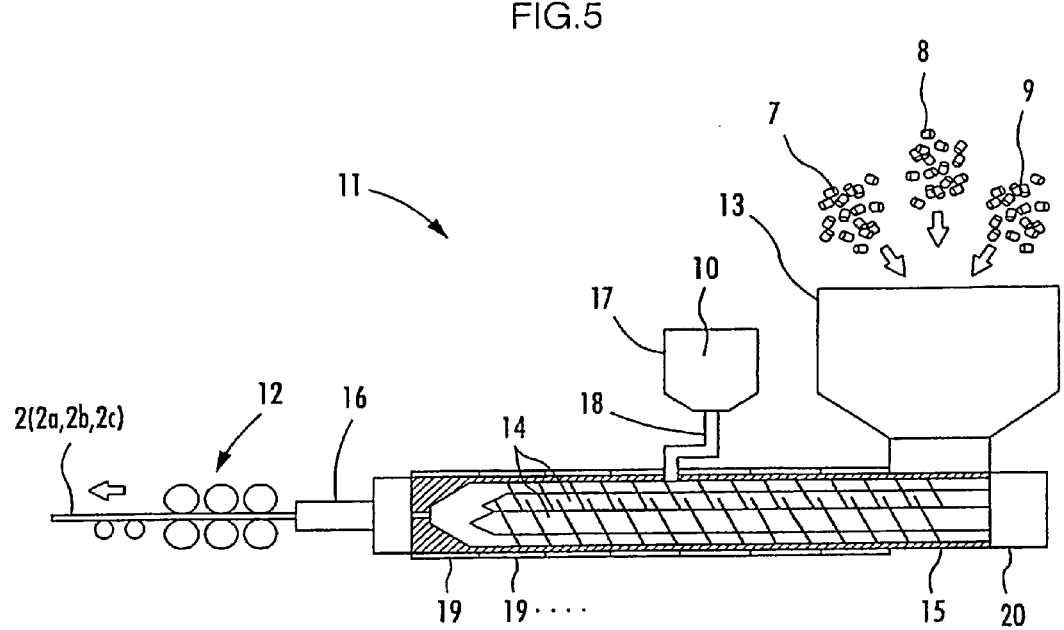
FIG. 5 is an explanatory view showing an extruder used for manufacturing the plate-like foamed product that constitutes the heat insulator.

The following describes a manufacturing method of the plate-like foamed product 2, with reference to FIG. 5. The plate-like foamed product 2 is manufactured by charging the paper pellet 7, the recycled resin pellet 8, and the foamable resin pellet 9 into an extruder 11, adding water to these raw materials to cause foaming while melt-kneading them in the extruder 11, and adjusting the foam in thickness by a thickness adjustment roller 12.

The extruder 11 includes a hopper 13 into which the raw materials are charged, a cylinder 15 having two screws 14 inside, and a die 16 provided at a downstream end of the cylinder 15. In addition, a water supply line 18 for mixing the water 10 in a tank 17 with the mixture inside the cylinder 15 is provided at an intermediate position of the cylinder 15. Moreover, a plurality of heaters 19 for heating the inside of the cylinder 15 are arranged in the cylinder 15 in an axial direction of the cylinder 15. Further, a motor 20 for rotating the screws 14 is provided upstream of the cylinder 15.

The die 16 extrudes the molten raw material mixture, which is pushed out from an exit of the cylinder 15, to the outside from small openings not shown, thereby forming the plate-like foamed product 2. The thickness adjustment roller 12 is provided downstream of a tip of the die 16. The thickness adjustment roller 12 adjusts, by a distance between metal rollers disposed on upper and lower sides and their pressing elastic force, the thickness of the object passing between the rollers.

The above-mentioned raw materials that are adjusted in supply amount are charged into the hopper 13 of the extruder 11, from a raw material supply not shown. The raw materials charged into the hopper 13 are supplied into the cylinder 15, and heated by the heaters 19 while being stirred by the two screws 14 in the cylinder 15, thereby being melt-mixed.

In this state, the paper pellet 7, the recycled resin pellet 8, and the foamable resin pellet 9 as the raw materials are kneaded with each other, so that the fine paper powder and starch included in the paper pellet 7, recycled polypropylene, polyethylene, and polystyrene included in the recycled resin pellet 8, and foamable polypropylene included in the foamable resin pellet 9 are kneaded with each other. The raw materials in the cylinder 15 are melt-kneaded by the screws 14 while being heated by the heaters 19, and conveyed downstream. During this, the molten mixture of the fine paper powder, starch, and the various synthetic resins is uniformly kneaded, as a result of which the fine paper powder is uniformly dispersed in the whole mixture.

Moreover, the heated water 10 is supplied from the water supply line 18, and mixed with the molten raw material mixture. The water 10 supplied into the raw material mixture is heated by the molten raw materials and the heaters 19 and as a result vaporized, thereby forming a large number of bubbles 5c in the raw material mixture.

The raw material mixture to which the water 10 is added in this way is then extruded from the die 16. The raw material mixture extruded from the small openings of the die 16 not shown is released under atmospheric pressure. This causes the bubbles 5c in the raw material mixture to expand, as a result of which the plurality of rod-like elements 5 are formed. The rod-like elements 5 are each formed to have the skin layer 5a and the foam layer 5b, when extruded from the small openings of the die 16. Here, it is considered that the skin layers 5a of the adjacent rod-like elements 5 contact with each other, where the raw materials forming the skin layers 5a are still in a molten state. Hence, the adjacent rod-like elements 5 are tightly connected to each other, thereby forming the plate-like foamed product 2.

After this, the plate-like foamed product 2 is cooled while being adjusted to a constant thickness by the thickness adjustment roller 12, and conveyed downstream. The plate-like foamed product 2 is then cut to a desired length.

The following describes an example of the plate-like foamed product 2. In the plate-like foamed product 2 of Example 1, the fine paper powder in the paper pellet 7 is 20% by weight and starch in the paper pellet 7 is 37% by weight, to the whole plate-like foamed product 2. The recycled resin pellet 8 is 13% by weight to the whole plate-like foamed product 2. The foamable resin pellet 9 is 30% by weight to the whole plate-like foamed product 2. The paper pallet 7 also includes less than 1% by weight of "ADK STAB" made by ADEKA Corporation as an antioxidant, and less than 1% by weight of calcium from calcined scallop shells as a fungicide.

Roll paper treated as industrial waste is used as the raw material of the fine paper powder. Industrial starch in widespread use is used as the starch.

The composition of the recycled resin pellet 8 itself is 60% by weight polypropylene, 35% by weight polyethylene, and 5% by weight polystyrene. Further, 16% by weight the water 10 is added to the mixture of the fine paper powder, starch, and the various synthetic resins for foaming.

Further, in the plate-like foamed product 2 of Example 2, the fine paper powder in the paper pellet 7 is 20% by weight and starch in the paper pellet 7 is 35% by weight, to the whole plate-like foamed product 2. The recycled resin pellet 8 is 15% by weight to the whole plate-like foamed product 2. The foamable resin pellet 9 is 30% by weight to the whole plate-like foamed product 2.

Still further, in the plate-like foamed product 2 of Example 3, the fine paper powder in the paper pellet 7 is 20% by weight and starch in the paper pellet 7 is 35% by weight, to the whole plate-like foamed product 2. The recycled resin pellet 8 is 20% by weight to the whole plate-like foamed product 2. The foamable resin pellet 9 is 25% by weight to the whole plate-like foamed product 2.

Moreover, in the plate-like foamed product 2 of Example 4, the fine paper powder in the paper pellet 7 is 20% by weight and starch in the paper pellet 7 is 35% by weight, to the whole plate-like foamed product 2. The recycled resin pellet 8 is 25% by weight to the whole plate-like foamed product 2. The foamable resin pellet 9 is 20% by weight to the whole plate-like foamed product 2.

In Examples 1 to 4, the total sum of the fine paper powder and starch in the paper pellet 7, the recycled resin pellet 8, and the foamable resin pellet 9 is 100% by weight. However, minute unavoidable impurities are also included therein.

Figure 6A:
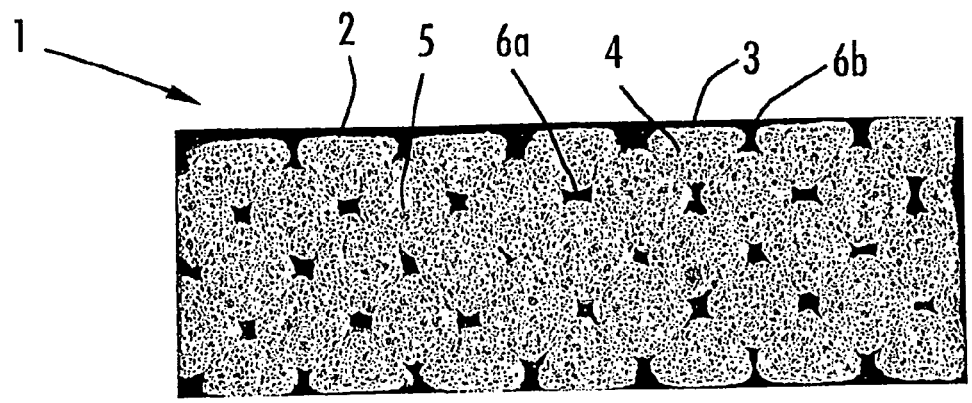
FIG. 6 is a photograph showing a cross section and a surface of the foamed product.
Figure 6B:
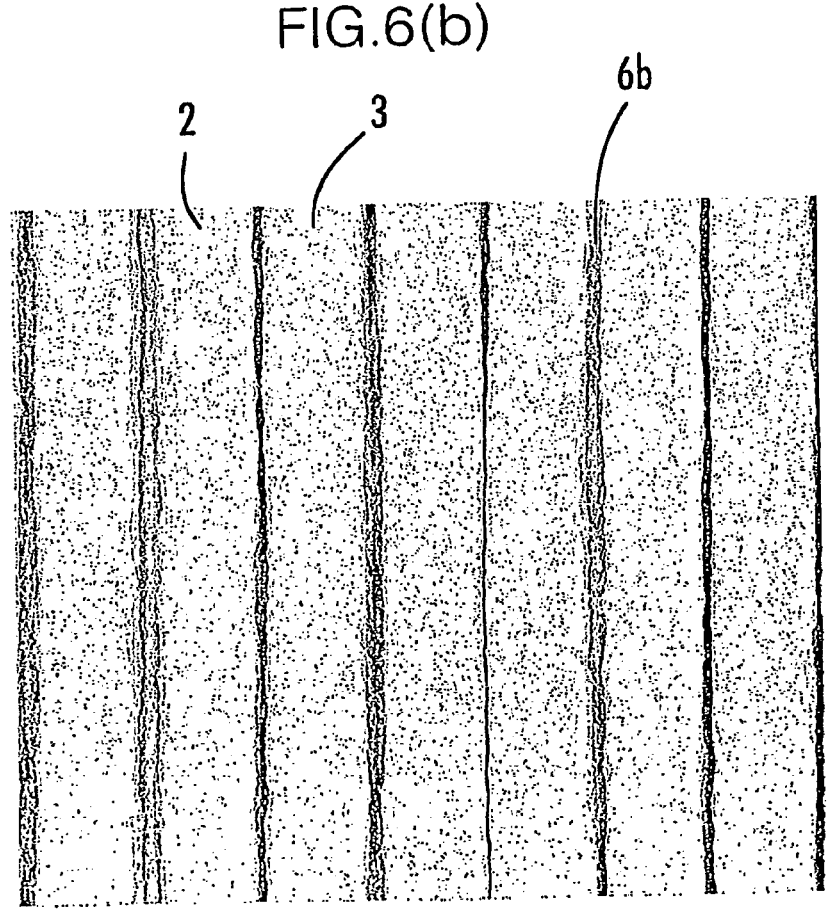

FIG. 6(a) shows a state of a cross section of the plate-like foamed product 2 of Example 1, and FIG. 6(b) shows a state of a surface of the plate-like foamed product 2 of Example 1. As shown in FIG. 6(a), the skin layer 5a has a smooth surface without bubbles. The thickness of the skin layer 5a is about 20 μm on average, as a result of measurement based on FIG. 6(a). Meanwhile, the bubbles 5c in the foam layer 5b are 200 μm in average particle diameter, as a result of measurement based on FIG. 6(a). As is clear from FIG. 6(a), most of the bubbles are closed cells.

In the plate-like foamed product 2 of Examples 2 to 4, the skin layer 3 also has a smooth surface without bubbles. The thickness of the skin layer 3 is 21 μm in Example 2, 23 μm in Example 3, and 25 μm in Example 4. Further, the diameter of the bubbles 5 in the foam layer 4 of the plate-like foamed product 2 of Examples 2 to 4 showed values equivalent to that in Example 1. Further, most of the bubbles in the foam layer 4 of the plate-like foamed product 2 of Examples 2 to 4 are closed cells.

Moreover, components of the skin layer 5a and the foam layer 5b of the plate-like foamed product 2 of Examples 1 to 4 were analyzed using an infrared absorption spectrum at the Tokyo Metropolitan Industrial Technology Research Institute which is a local incorporated administrative agency. As a result, it was found that the skin layer 5a and the foam layer 5b both show the same spectral waveform, and have a uniform mixture of polypropylene, polyethylene, and polystyrene as the raw materials.

Thus, in the plate-like foamed product 2 of Examples 1 to 4, polypropylene and polyethylene, which have conventionally been difficult to mix uniformly, are mixed uniformly. This demonstrates that, according to the present invention, a foam of stable quality can be obtained even when using, as a raw material, a container re-pellet which inevitably includes the two synthetic resins.

Furthermore, the plate-like foamed product 2 of Examples 1 exhibits thermal conductivity of 0.035 W/mK on average when used as a heat insulator. Since the plate-like foamed product 2 has a thickness of 30 mm, i.e., 0.03 m, converting to thermal resistance yields 0.86. Thermal conductivity similar to Example 1 was obtained in each Examples 2 to 4.

Accordingly, the plate-like foamed product 2 of Examples 1 to 4 achieves thermal resistance of 2.32, when the three plate-like foamed products 2a to 2c of 27 mm in thickness are overlaid to have a thickness of 81 mm. The plate-like foamed product 2 having such thermal resistance can meet a requirement (2.2) as a floor heat insulator for next-generation energy-saving houses.

Thus, the heat insulator 1 in Examples 1 to 4 uses the plate-like foamed products 2a to 2c having the above-mentioned structure, and therefore has high heat insulation properties. Moreover, since the heat insulator 1 has the sheet member 3, for example when using the heat insulator 1 as an underfloor heat insulator in a non-floor-joist method, an installation operation can be easily performed by laying the sheet member 3 on each beam and fixing the sheet member 3 to each beam with nails, screws, and the like.

Besides, since the heat insulator 1 has the sheet member 3, a force applied to the heat insulator 1 when installing the heat insulator 1 in an installation position can be distributed to the beams and the like by the sheet member 3. This suppresses deflection of the heat insulator 1, which contributes to improved durability of the heat insulator 1.

Figure 7A:
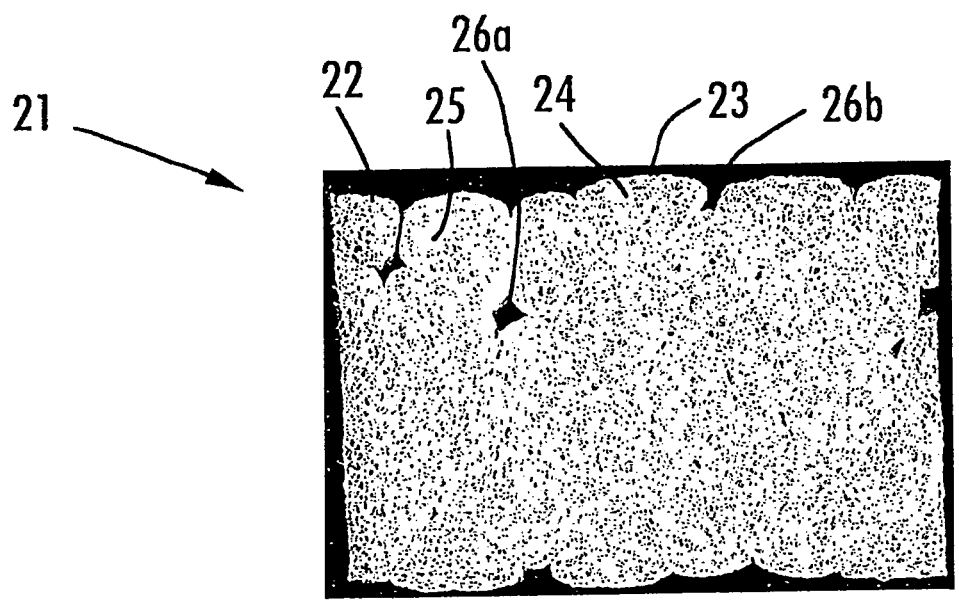
FIG. 7 is a photograph showing a cross section and a surface of a foamed product which is a comparative example.

A comparative example in which only the foamable resin pellet 9 is used as a raw material without using the recycled resin pellet 8 while the other raw materials and the manufacturing method are the same as Example 1 is described below. As shown in FIG. 7(a), a foam 21 of the comparative example has rod-like elements 22 that are each separated into a skin layer 23 and a foam layer 24 like the plate-like foamed product 2, but the skin layer 23 is extremely thin with an average thickness of about 10 μm.

Figure 7B:
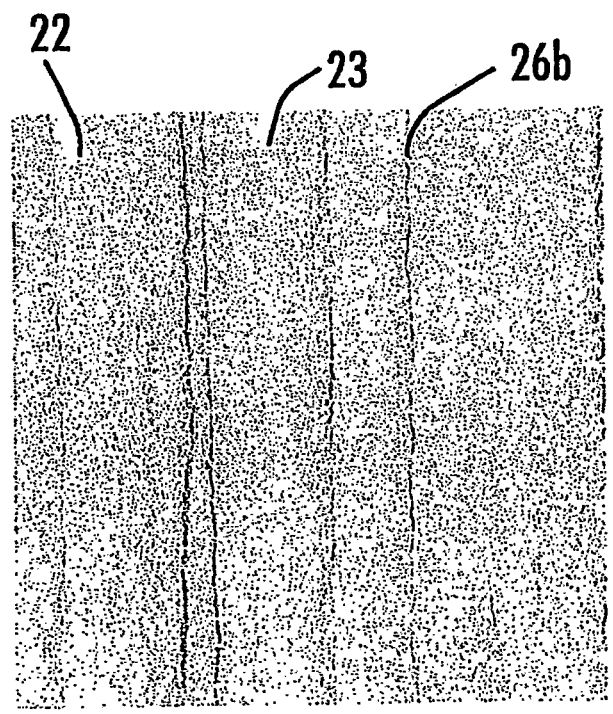

Besides, as shown in FIG. 7(b), though there are no bubbles 25 on the surface of the foam 21, the inside bubbles 25 are visible from the outside. An average diameter of the bubbles 25 in the foam layer 24 as calculated based on FIG. 7(a) is about 100 μm.

Moreover, the rod-like elements 22 in the foam 21 are in close contact with each other with almost no gaps, and there are almost no voids 26a unlike the plate-like foamed product 2. Furthermore, grooves 26b on the surface are narrow and have a shallow depth, as compared with the grooves 6b of Example 1.

This foam 21 has significantly lower heat insulation performance than the above-mentioned example. Even when three foams 21 are overlaid, the requirement (2.2) as a floor heat insulator for next-generation energy-saving houses cannot be met.

As a result of measuring the mechanical strength of the plate-like foamed product 2 of Example 1, the plate-like foamed product 2 exhibits bending strength of 0.058 MPa. Further, the plate-like foamed product 2 of Example 2 exhibits bending strength of 0.059 MPa, the plate-like foamed product 2 of Example 3 exhibits bending strength of 0.062 MPa, and the plate-like foamed product 2 of Example 4 exhibits bending strength of 0.064 MPa. On the other hand, the foam 21 of the comparative example has much lower bending strength than in Examples 1 to 4. Thus, the plate-like foamed product 2 has high mechanical strength because the skin layers 5a of the plurality of rod-like elements 5 are firmly and tightly connected to each other, as compared with the case of using only the foamable resin pellet 9.

In addition, even when a force is applied to separate each rod-like element 5 in the plate-like foamed product 2 of Examples 1 to 4, each rod-like element 5 is not easily separated. In the case of the foam 21 of the comparative example, however, each rod-like element 22 can be separated relatively easily.

Furthermore, in the plate-like foamed product 2 of Examples 1 to 4, the paper pellet 7 occupies at least 50% of the total weight of the plate-like foamed product 2. Accordingly, the plate-like foamed product 2 itself is not subject to recycling in the Law for Recycling of Containers and Packaging, and can be disposed as general waste. Besides, calculating a calorific value of the plate-like foamed product 2 of Example 1 yields about 5900 cal/g. The calorific value of the plate-like foamed product 2 of Examples 2 to 4 shows similar value. Since the plate-like foamed product 2 has such a low calorific value, there is no possibility that an incinerator is damaged in the case of incineration disposal.

Though industrial waste roll paper is used as the fine paper powder in the above embodiment, the raw material of the fine paper powder is not limited to this, and may be any of various used paper such as old newspapers, old magazines, printed paper, used wrapping paper, used corrugated paper, used OA paper, broken paper or damaged paper during manufacture of virgin paper, and cutting wastage, abrasive powders, shredder scrap of magazines and the like. Waste paper is discharged in large quantity from offices, publishing companies, paper-manufacturing companies, and the like, and evaluated to have substantially no environmental burden. Note that the average particle diameter of the paper powder is measured using a laser diffraction particle size distribution measurement device (Mastersizer S made by Malvern Instruments Ltd.).

Though starch is used as a hydrophilic macromolecule in the above embodiment, there is no particular limit on starch, as maize starch, sweet potato starch, potato starch, wheat starch, barley starch, rice starch, and the like may be used. Moreover, the hydrophilic macromolecule may be glue, natural rubber, or agar, instead of starch. Although not shown, it was confirmed that the similar result to those in the above-mentioned examples is obtained, in the case where hydrophilic macromolecules other than starch, such as a agar, is used.

Though the plate-like foamed product 2 has a dimension suitable as a residential heat insulator in the above embodiment, the plate-like foamed product 2 is not limited to use as a residential heat insulator, and may be used for various applications such as a cushioning medium, a sound insulator, and a cold insulator. In addition, the plate-like foamed product 2 may be molded in various shapes according to applications.

Though "NEWFOAMER" made by Japan Polypropylene Corporation is used as foamable polypropylene in the above embodiment, this is not a limit for the present invention, and foamable polypropylene having similar properties may be used.

What is claimed is:

1. A heat insulator including a paralellpiped-shaped foamed product, the parallelepiped-shaped foamed product being made from a plurality of straight elongate elements while tightly connecting the surfaces of adjacent straight elongate elements to each other, so that voids that extend in a lengthwise direction of the straight elongate elements are formed between the straight elongate elements;

said paralellepiped-shaped foamed product being formed by extruding charged materials from a die and passing the extruded materials between rollers to produce tightly connected surfaces of a plurality of said straight elongate elements, each of said straight elongate elements having, on a surface thereof, a skin layer with no bubbles, the skin layer covering an inside foam layer, wherein the skin layer exhibits an infrared absorption spectral waveform equivalent to that of the foam layer;

the heat insulator being formed by bonding a plurality of said paralellepiped-shaped foamed products together so that the lengthwise directions of the straight elongate elements forming the paralellpiped-shaped foamed products are mutually orthogonal;

the plurality of straight elongate elements being made from a heated and foamed mixture of 50 to 65% by weight of a paper pellet, 13 to 25% by weight of a recycled resin, and 10 to 30% by weight of an HMS-PP foamable polypropylene resin, the total sum thereof being 100% by weight;

the paper pellet being a mixture of 35 to 50% by weight of a fine paper powder having a particle diameter of 30 to 200 μm and 50 to 65% by weight of a hydrophilic macromolecule, the total sum thereof being 100% by weight; and the recycled resin being a mixture of 55 to 65% by weight of a recycled polypropylene resin, 30 to 40% by weight of a recycled polyethylene resin, and 1 to 5% by weight of a recycled polystyrene resin, the total sum thereof being 100% by weight.

2. The heat insulator according to claim 1, wherein the straight elongate elements are formed by heat mixing and foaming the paper pellet, the recycled resin, the HMS-PP foamable polypropylene resin and water, the water being in a range of 10 to 20% by weight to the paper pellet, the recycled resin, and the HMS-PP foamable polypropylene resin.

3. The heat insulator according to claim 1, wherein an uppermost paralellpiped-shaped foamed product of the paralellpiped-shaped foamed products is wider than a lower paralellpiped-shaped foamed product of the paralellpiped-shaped foamed products, and has, in a thickness direction, slits that are orthogonal to the lengthwise direction of the straight elongate elements near front and back ends of the lengthwise direction of the straight elongate elements.

4. The heat insulator according to claim 1, wherein a sheet member covers a bottom surface and at least one pair of side surfaces of an assembly of the paralellpiped-shaped foamed products, and has protrusions that protrude outward from upper edges of the pair of side surfaces.

* * * * *